United States Patent [19]

Hill

[11] Patent Number: 4,887,630

[45] Date of Patent: Dec. 19, 1989

[54] PNEUMATIC CONTROL SYSTEM FOR AIR HANDLING SYSTEM DAMPER

[75] Inventor: James R. Hill, Toledo, Ohio

[73] Assignee: Mestek, Inc., Westfield, Mass.

[21] Appl. No.: 324,249

[22] Filed: Mar. 15, 1989

[51] Int. Cl.$^4$ .............................................. F16K 17/38
[52] U.S. Cl. .................................... 137/72; 137/75; 137/79; 251/25; 251/66
[58] Field of Search ............... 137/72, 79, 75; 251/25, 251/66

[56] References Cited

U.S. PATENT DOCUMENTS

| Re. 30,204 | 2/1980 | Root | 137/77 |
|---|---|---|---|
| 857,073 | 6/1907 | Kemmler | 137/79 X |
| 2,148,383 | 2/1939 | Tyden | 137/79 X |
| 2,181,961 | 12/1939 | Bingham | 137/72 |
| 2,236,249 | 3/1941 | Newton | 137/79 X |
| 2,555,461 | 6/1951 | Auguste | 137/72 X |
| 3,312,159 | 4/1967 | Shepherd | 137/72 X |
| 3,394,687 | 7/1968 | Scott | 137/79 X |
| 3,568,774 | 3/1971 | Meoule | 251/25 X |
| 3,618,627 | 11/1971 | Wagner | 137/72 X |
| 3,916,930 | 11/1975 | Erickson | 137/75 |
| 3,955,589 | 5/1976 | Beazley | 137/75 |
| 4,091,832 | 5/1978 | Snyder et al. | 137/72 |
| 4,397,223 | 8/1983 | Maxson | 137/75 X |
| 4,487,214 | 12/1984 | Tatum | 137/72 |
| 4,635,669 | 1/1987 | Thoor | 137/79 |
| 4,635,670 | 1/1987 | Kilmoyer | 137/79 X |
| 4,727,903 | 3/1988 | Sturgis et al. | 137/75 X |

Primary Examiner—John Rivell
Attorney, Agent, or Firm—Willian Brinks Olds Hofer Gilson & Lione

[57] ABSTRACT

A damper for an air handling system in which the blade or blades are normally positioned to permit air to flow through the damper by a pneumatic cylinder which, when pneumatically actuated, overcomes the force of a spring within the pneumatic cylinder which would otherwise position the blade or blades to close the damper to air flow. The pneumatic cylinder normally receives air through a primary outlet of a three-way valve, the three-way valve also having a vent outlet and a valve member which is movable to permit pneumatic flow either from a source of pneumatic fluid through the primary outlet or from the pneumatic cylinder back through the three-way valve for venting through the vent outlet. The valve member is biased to permit pneumatic flow only through the vent outlet, but it has a portion which extends beyond the valve body and which is restrained by a mechanism that includes a fusible link to restrain the movement of the valve member so that it normally only permits pneumatic flow through the primary outlet. In the event of a fire or other condition of excessive temperature the fusible link will fail, the valve member will move to its venting position, and the spring within the pneumatic cylinder will close the damper to air flow.

33 Claims, 2 Drawing Sheets

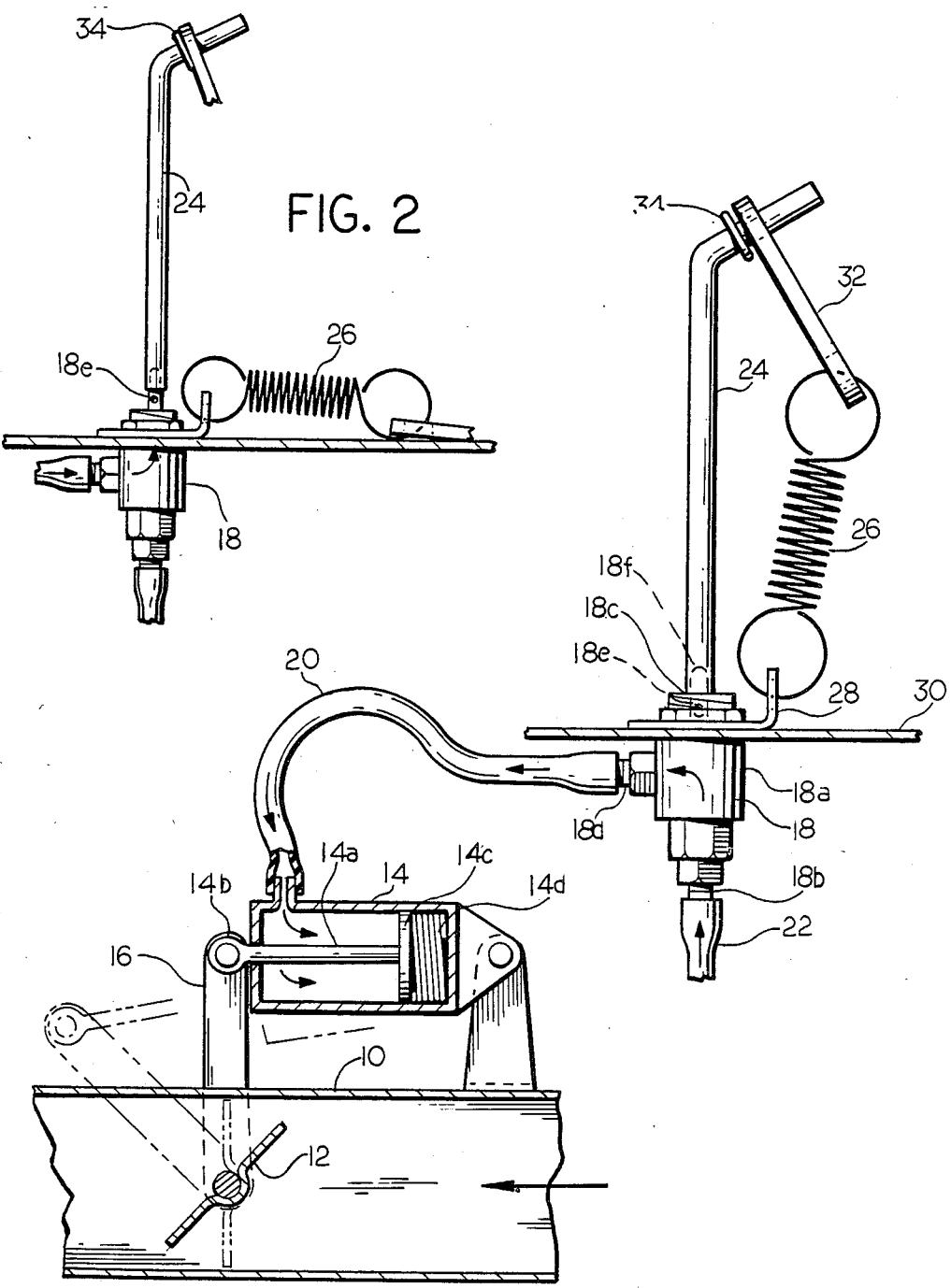

PNEUMATIC CONTROL SYSTEM FOR AIR HANDLING SYSTEM DAMPER

BACKGROUND OF THE INVENTION

1. Field of the Invention

This invention relates to a pneumatic control system for use in conjunction with a controllable damper in an air handling system for automatically closing the damper in the event of a fire. More particularly, this invention relates to a three-way emergency relief valve for use in such pneumatic control system.

2. Description Of The Prior Art

It is known that it is desirable to close the blades or louvers of a damper, for example, a damper of the type used in a building air handling system, to the flow of air in the event of a fire, to thereby prevent the spread of smoke and high temperature gases throughout the building. Heretofore, this has been done, for example, by dampers of the type described in U.S. Pat. No. Re. 30,204 (Root) in which the damper blades are spring biased toward their closed positions and in which the mechanical blade operating linkage, which can normally operate to position the damper blades at open, flow permitting positions, includes a fusible portion. This portion frequently referred to as a fusible link, is designed to fail in an environment where the temperature exceeds a predetermined value. Thus, in the event of a fire in such a system, eventually the fusible link will overheat and fail, and the damper blades will be returned to their closed, flow restricting positions by the spring elements which normally bias the blades toward such positions. However, in a system of this type, a fusible link must be relatively large, since it is exposed to the full magnitude of the loads which are transmitted through the blade operating mechanism. Furthermore, because of the size of such fusible links and the thermal capacitance which results therefrom, it takes a significant amount of time for the fusible link to reach its failure temperature after the surrounding temperature reaches such level, and this results in a delay in the closing of the damper. U.S. Pat. No. 3,312,159 (W. Shepard) also discloses a prior art air handling system damper which will be automatically closed in the event of a fire as a result of the failure of a fusible link in its blade operating mechanism.

SUMMARY OF THE INVENTION

According to the present invention there is provided a damper for an air handling system which automatically closes in the event of a fire or other condition leading to an excessive temperature in the region of the damper, and which eliminates the need for a fusible link in the damper blade operating mechanism. The damper of the present invention includes a pneumatic operator for controlling the position of the damper blades during the normal operation of the damper between an opened, flow permitting condition and a closed, flow restricting condition, as desired. The flow of pneumatic fluid to the pneumatic operator is controlled by a three-way valve. The valve element is movable between a first position, which permits pneumatic fluid to flow from an inlet port to a first outlet port, which is in communication with the pneumatic operator, and a second position which permits pneumatic fluid from the pneumatic operator to flow back through the three-way valve to vent through a second outlet port. The valve element is spring biased to the second or venting position, but it is normally maintained in its first or non-venting position to permit pneumatic air to flow to the pneumatic operator, against the effect of the spring biasing forces which act thereon, by a mechanical restraint. The mechanical restraint, which operates under much lower load levels than the blade operating mechanism of a damper of the type disclosed in the aforesaid prior art references, includes a fusible link which will fail in the event of an excess temperature condition, and which will do so more rapidly than the fusible links of the blade operating mechanisms of prior art dampers because it can be significantly smaller since it is operating under much lower load levels. Of course, upon failure of the fusible link, the mechanical restraint no longers restrains the valve element in its first position, and it thereupon, moves into its second or venting position because of the spring forces which act on it.

Accordingly, it is an object of the present invention to provide an improved air handling system damper of the type in which the blade or blades thereof will automatically move to closed, flow restricting positions in the event of a fire or other condition of excessive temperature. More particularly, it is an object of the present invention to provide an air handling system damper of the foregoing type which eliminates the need for a fusible link in the mechanical linkage which is normally provided to operate the positions of the blade or blades of such damper. Even more particularly, it is an object of the present invention to provide an air handling system damper of the foregoing type which incorporates a pneumatic operator for operating the damper blade positioning mechanism and in which the flow of pneumatic air to the pneumatic operator, which operates to maintain the damper in an open condition, is automatically terminated in the event of a fire or other condition of excessive temperature. Further, it is an object of the present invention to provide a three-way pneumatic valve for controlling the operation of a pneumatic operator in an air handling system damper to ensure the closure of the blade or blades of the damper in the event of a fire or other condition of excessive temperature.

For a further understanding of the present invention and the objects thereof, attention is directed to the drawing and the following brief description thereof, to the detailed description of the preferred embodiment and to the appended claims.

DESCRIPTION OF THE DRAWING

FIG. 1 is an elevational view, partly in section, of an air handling system according to a preferred embodiment of the present invention;

FIG. 2 is a fragmentary elevational view of a portion of the apparatus of FIG. 1 in an alternative condition of such apparatus;

DETAILED DESCRIPTION OF THE PREFERRED EMBODIMENT

Figure 3:
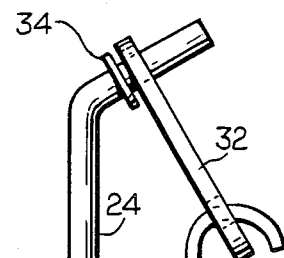
FIG. 3 is an elevational view of a portion of an alternative embodiment of the present invention.

FIG. 1 illustrates a duct 10 of an air handling system, the duct 10 having a single blade damper 12 which is oscillatable about its central axis, which extends transversely through the duct 10, between an open position which is illustrated in solid line and which permits air to flow through the duct 10, and a closed position which is illustrated in dotted line and which blocks the duct 10 to the flow of air. While the invention is illustrated in relationship to a single blade damper for the sake of simplicity, it is to be understood that it is also adaptable to a multiple blade damper, for example, a damper of the type illustrated in the aforesaid U.S. Pat. No. Re. 30,204 or of the type illustrated in the aforesaid U.S. Pat. No. 3,312,159. In any case, the damper blade 12 has a mechanical link 16 attached thereto for oscillating movement of the link 16 with the damper blade 12 about the central axis of the blade 12. The movement of the link 16 is actuated by a pneumatic cylinder 14, the cylinder 14 having a reciprocable rod portion 14a which is pivotably attached at its outer end 14b to an end of the link 16 that is away from the central axis of the blade 12. The pneumatic cylinder 14 has a piston portion 14c which is acted on by a coiled spring portion 14d in such a manner as to normally position the blade 12 in its closed position. However, the piston portion 14c is movable under the influence of pneumatic air pressure from a three-way valve 18 which enters the cylinder 14 by way of an inlet line 20 on the opposite side of the piston portion 14c than the coiled spring portion 14d. Thus, pneumatic air pressure within the pneumatic cylinder 14 will move the link 16 and the damper blade 12 from their normally closed, dotted line positions to their open, solid line positions. One of the advantages of the air handling system damper of the present invention in relation to the prior art air handling systems damper, as heretofore described, is that the spring portion 14d of the pneumatic cylinder 14, in effect, is the spring actuator for positioning the damper blade 12 in its closed position. This eliminates the need for the external springs and many other related complex mechanical elements of such prior art damper closing systems. Further, by such elimination of external damper blade closing springs and related mechanical elements, it is possible to decrease the size of the pneumatic operator for any given size damper since it will have a smaller mass to operate. Further yet, since the linkage between the pneumatic cylinder 14 and the damper blade 12 does not incorporate a fusible link therein and does not, therefore, fail in the event of overheating, it is not necessary, unlike the linkage in many prior art air handling system dampers, in the air handling system damper according to the present invention, to provide separate mechanical elements to positively lock the blade 12 in its closed position in the event of a fire.

The three-way valve 18, which is a normally closed three-way poppet type of miniature valve such as that sold under the product designation MAV-3 by Clippard Instrument Laboratory, Inc. of Cincinnati, Ohio, has a body 18a with an inlet fitment 18b which receives pneumatic air from a supply, not shown, through a supply line 22, and a first, primary outlet fitment 18d which is in fluid communication with the pneumatic cylinder. The three-way valve 18 further has a second outlet fitment 18c and an internal valve element 18f which is reciprocable within the body 18a of the valve 18 between a first position which permits pneumatic air entering the valve 18 by the fitment 18b to exit therefrom through the fitment 18d, by which it will pass into the pneumatic cylinder 14 to the inlet 20, and a second position which permits pneumatic air in the cylinder 14 to vent back through the three-way valve 18 to pass therefrom through the second outlet fitment 18c, in which case it will be vented to the atmosphere. The venting of pneumatic air through the fitment 18c, as heretofore explained, occurs through a port 18e in the valve element 18f, which is spring biased to a position where the port 18e is opened to the atmosphere and the flow of air from the inlet fitment 18b to the primary outlet fitment 18d is blocked. In the embodiment of FIGS. 1 and 2, an exposed portion of the valve element 18f is securely engaged within an open end of an elongate tubular member 24 such that the port 18e is normally kept within the body 18a of the valve 18 so that pneumatic air cannot be exhausted therethrough.

The tubular member 24 is normally restrained in its FIG. 1 position, which is the non-venting position of the valve 18, by a retaining double ended coil spring 26 which has one of its ends engaged by a retaining flange 28. The flange 28 is attached to a fixed sheet metal member 30, for example, to an element of the air handling system. The coil spring 26 has its other end engaged by an end of a fusible link 32, the other end of which engages the remote end of the tubular member 24, which is bent at an oblique angle to develop a suitable mechanical advantage. A clipped ring 34 is attached to the tubular member 24 to prevent excessive movement of the fusible link 32 with respect to the longitudinal axis of the tubular member 24. Thus, so long as the fusible link 32 is intact, the tubular member 24 will be drawn downwardly, in the orientation of the valve 18 which is illustrated in FIGS. 1 and 2, so that its lowermost end engages the top of the fitment 18c of the valve 18, and maintains the port 18e within the body of the valve 18 in a non-venting position. However, the fusible link 32 is designed to fail in the event of an excessive temperature condition in the region of the duct 10, for example, in the event of a fire. Upon the failure of the fusible link 32, as is shown in FIG. 2, there will no longer be any downwardly directed force on the tubular member 24 as a result of the spring 26, and the valve element 18f will be free to move upwardly within the valve 18, to thereby reposition the valve port 18e externally of the valve 18 so that pneumatic air from the cylinder 14 will be vented therethrough. In this condition of the valve 18, no pneumatic air will flow through the first outlet fitment 18d of the valve 18 into the pneumatic cylinder 14, and the spring 14d of the pneumatic cylinder will, consequently, urge the piston 14c to its left, in the orientation of the cylinder 14 which is illustrated in FIG. 1, which will move the damper blade 12 into its closed position. Because of the fact that the fusible link 32 does not have to operate under the load levels that are required in a mechanical linkage system for operating a damper blade element, as in the case of prior art air handling system damper blade mechanisms, it can be substantially smaller than the fusible links heretofore employed in such systems, and because of its smaller size it will come up to its failure temperature much more quickly in the event of a fire. Further, because of the tubular member 24, the fusible link 32 can be positioned away from the structure to which the valve 18 is attached, for example, to position it in the stream of air flowing through the associated damper to permit it to rapidly sense a developing condition of excessive temperature. While the damper 12 has been described as a damper which is used in conjunction with a duct in an air handling system, it is to be understood that it is within the contemplation of this invention that it can also be used to control the operation of a damper which is not used with a duct, for example, a damper of the type which is used in a wall between adjacent rooms in a building, a type of damper which is frequently described as a fire damper when it has a high temperature automatic closing feature.

FIG. 3 illustrates an embodiment of an installation for a pneumatic emergency relief valve 18 which is quite similar to that of FIGS. 1 and 2 except that a modified retainer 128 is substituted for the flange 28 and the spring 26 to engage an end of the fusible link 32. The advantage of the embodiment of the installation of FIG. 3 in relation to that of FIGS. 1 and 2 is that the length of the retainer 128 is inelastically fixed, for all practical purposes, whereas the length of the spring 26 can vary, for example, due to vibrations or impact loads within the air handling system which incorporates such a relief valve. Thus, the installation of FIG. 3 more positively prevents an unwanted damper closing.

Figure 4:
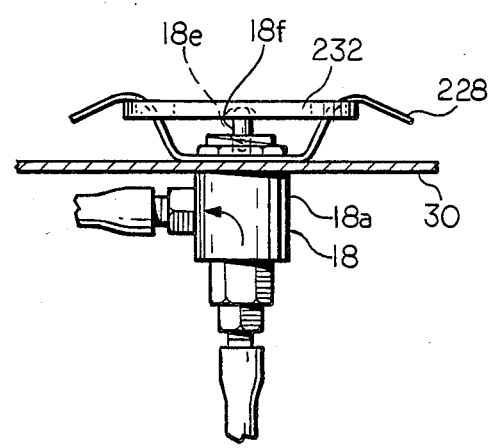
FIG. 4 is an elevational view of the portion of yet another alternative embodiment of the present invention.
Figure 5:
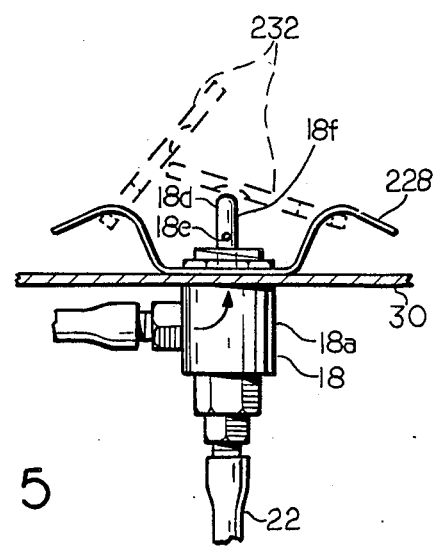
FIG. 5 is a view of the apparatus of FIG. 4 in an alternative condition of such apparatus.

FIGS. 4 and 5 illustrate another type of installation for a pneumatic emergency relief valve 18 in which a major portion of the valve element 18f is normally held within the body 18a of the valve 18 directly by contact between the free end of the valve element 18f and a fusible link 232 whose opposed ends are engaged by reverse curved end portions of a mounting bracket 228 which is attached to the sheet metal member 30. As is shown in FIG. 5, when the temperature of the fusible link 232 reaches a predetermined level it will fail, thus allowing the valve element 18f to move to position the port 18e externally of the body 18a of the valve 18 to vent the pneumatic air which flows into the valve 18 through the supply line 22. In relation to the embodiment of FIGS. 1 and 2 and to the embodiment of FIG. 3, the embodiment of FIGS. 4 and 5 provides for a more compact, space saving installation. Of course, in the embodiment of FIGS. 4 and 5 the fusible link 232 must be positioned quite close to the valve 18, and this may mean that the fusible link 232 is positioned in a dead air space, or in an otherwise shielded or shaded region, where it may respond more slowly to a developing condition of excessive temperature.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. In combination with a damper having at least one blade for controlling the flow of air through said damper, said at least one blade being movable between an open, flow permitting condition and a closed, flow restricting condition:
    fluid pressure operator means for moving said at least one blade, said fluid pressure operator means comprising first biasing means normally urging said at least one blade to said closed, flow restricting condition,
    a source of fluid pressure normally in communication with said fluid pressure operator means and normally overcoming the effect of said first biasing means;
    a three-way valve between said source of fluid pressure and said fluid pressure operator means, said three-way valve comprising a vent outlet, a valve member which is movable between a first position in which fluid flows from said source of fluid pressure to said fluid pressure operator means and a second position in which fluid flows from said fluid pressure operator means through said vent outlet, and second biasing means normally biasing said valve member toward said second position; and
    restraining means comprising a fusible link normally restraining said valve member of said three-way valve in said first position, said fusible link being subject to failure in the event of a condition of excessive temperature, whereupon said second biasing means will move said valve member to said second position, said fluid will flow from said fluid pressure operator means through said vent outlet, and said first biasing means will move said at least one blade to said closed, flow restricting condition.

2. A combination according to claim 1 wherein said fluid pressure operator means comprises a cylinder, a piston which is movable within said cylinder, said piston having a rod which extends from one side thereof outwardly from said cylinder, said cylinder normally receiving fluid pressure from said source of fluid pressure on said one side of said piston, said first biasing means being positioned within said cylinder and acting on the other side of said piston and tending to increase the length of said rod which extends outwardly from said cylinder.

3. A combination according to claim 2 wherein said fluid pressure operator means comprises a pneumatic cylinder, and wherein said source of fluid pressure is a source of pneumatic pressure.

4. A combination according to claim 3 wherein said three-way valve comprises a valve body, wherein said valve member has a portion which extends outwardly from said valve body, wherein said valve member carries said vent outlet, said vent outlet being within said valve body when said valve member is in said first position and being outside said valve body when said valve member is in said second position, and wherein said restraining means normally engages said valve member to maintain said vent outlet within said valve body.

5. A combination according to claim 4 wherein said restraining means further comprises mounting bracket means engaging said fusible link at spaced apart locations to position said fusible link in engagement with a portion of said valve member to maintain said valve member in said first position, said portion of said valve member engaging said fusible link at a location between said spaced apart locations.

6. A combination according to claim 4 wherein said restraining means further comprises:
    tubular extension means having a first end engaging said valve member and a second end, said fusible link having a first end which engages said tubular member at a location adjacent said second end of said tubular means, said fusible link further having a second end; and
    retaining means engaging said second end of said fusible link.

7. A combination according to claim 6 wherein said second end of said tubular member extends at an oblique angle with respect to said first end.

8. A combination according to claim 7 wherein said retaining means comprises a double ended spring.

9. A combination according to claim 7 wherein said retaining means is substantially inelastically fixed.

10. A combination according to claim 2 wherein said three-way valve comprises a valve body, wherein said valve member has a portion which extends outwardly from said valve body, wherein said valve member carries said vent outlet, said vent outlet being within said valve body when said valve member is in said first position and being outside said valve body when said valve member is in said second position, and wherein said restraining means normally engages said valve member to maintain said vent outlet within said valve body.

11. A combination according to claim 10 wherein said restraining means further comprises mounting bracket means engaging said fusible link at spaced apart locations to position said fusible link in engagement with a portion of said valve member to maintain said valve member in said first position, said portion of said valve member engaging said fusible link at a location between said spaced apart locations.

12. A combination according to claim 10 wherein said restraining means further comprises:
tubular extension means having a first end engaging said valve member and a second end, said fusible link having a first end which engages said tubular member at a location adjacent said second end of said tubular means, said fusible link further having a second end; and
retaining means engaging said second end of said fusible link.

13. A combination according to claim 12 wherein said second end of said tubular member extends at an oblique angle with respect to said first end.

14. A combination according to claim 13 wherein said retaining means comprises a double ended spring.

15. A combination according to claim 13 wherein said retaining means is substantially inelastically fixed.

16. A combination according to claim 1 wherein said three-way valve comprises a valve body, wherein said valve member has a portion which extends outwardly from said valve body, wherein said valve member carries said vent outlet, said vent outlet being within said valve body when said valve member is in said first position and being outside said valve body when said valve member is in said second position, and wherein said restraining means normally engages said valve member to maintain said vent outlet within said valve body.

17. A combination according to claim 16 wherein said restraining means further comprises mounting bracket means engaging said fusible link at spaced apart locations to position said fusible link in engagement with a portion of said valve member to maintain said valve member in said first position, said portion of said valve member engaging said fusible link at a location between said spaced apart locations.

18. A combination according to claim 16 wherein said restraining means further comprises:
tubular extension means having a first end engaging said valve member and a second end, said fusible link having a first end which engages said tubular member at a location adjacent said second end of said tubular means, said fusible link further having a second end; and
retaining means engaging said second end of said fusible link.

19. A combination according to claim 18 wherein said second end of said tubular member extends at an oblique angle with respect to said first end.

20. A combination according to claim 19 wherein said retaining means comprises a double ended spring.

21. A combination according to claim 19 wherein said retaining means is substantially inelastically fixed.

22. A combination according to claim 1 and further comprising:
a duct, said duct being adapted to have air flow therethrough, said damper being positioned in said duct.

23. A fluid pressure control system, said fluid pressure control system being sensitive to a condition of excessive temperature and comprising:
fluid pressure operator means having a first operating position and a second operating position and comprising first biasing means normally urging said fluid pressure operator means to one of said first operating position and said second operating positions;
a source of fluid pressure normally in communication with said fluid pressure operator means and normally overcoming the effect of said first biasing means;
a three-way valve between said source of fluid pressure and said fluid pressure operator means, said three-way valve comprising a vent outlet, a valve member which is movable between a first position in which fluid flows from said source of fluid pressure to said fluid pressure operator means and a second position in which fluid flows from said fluid pressure operator means through said vent outlet, and second biasing means normally biasing said valve member toward said second position; and
restraining means comprising a fusible link normally restraining said valve member of said three-way valve in said first position, said fusible link being subject to failure in the event of a condition of excessive temperature, whereupon said second biasing means will move said valve member to said second position, said fluid will flow from said fluid pressure operator means through said vent outlet, and said first biasing means will move said fluid pressure operator means to said one of said first operating position and said second operating position.

24. A control system according to claim 23 wherein said fluid pressure operator means comprises a cylinder, a piston which is movable within said cylinder, said piston having a rod which extends from one side thereof outwardly from said cylinder, said cylinder normally receiving fluid pressure from said source of fluid pressure on said one side of said piston, said first biasing means being positioned within said cylinder and acting on the other side of said position and tending to increase the length of said rod which extends outwardly from said cylinder.

25. A control system according to claim 24 wherein said fluid pressure operator mean comprises a pneumatic cylinder, and wherein said source of fluid pressure is a source of pneumatic pressure.

26. A control system according to claim 25 wherein said three-way valve comprises a valve body, wherein said valve member has a portion which extends outwardly from said valve body, wherein said valve member carries said vent outlet, said vent outlet being within said valve body when said valve member is in said first position and being outside said valve body when said valve member is in said second position, and wherein said restraining means normally engages said valve member to maintain said vent outlet within said valve body.

27. In combination with a three-way valve for use between a source of fluid pressure and fluid pressure operator means, said three-way valve comprising a vent outlet, a valve member which is movable between a first position in which fluid is adapted to flow from the source of fluid pressure to the fluid pressure operator means and a second position in which fluid is adapted to flow from the fluid pressure operator means through the vent outlet, and biasing means normally biasing said valve member toward said second position:
   restraining means comprising a fusible link normally restraining said valve member of said three-way valve in said first position, said fusible link being subject to failure in the event of a condition of excessive temperature, whereupon said biasing means will move said valve member to said second position, and the fluid will flow from the fluid pressure operator means through said vent outlet.

28. A combination according to claim 27 wherein said three-way valve comprises a valve body, wherein said valve member has a portion which extends outwardly from said valve body, wherein said valve member carries said vent outlet, said vent outlet being within said valve body when said valve member is in said first position and being outside said valve body when said valve member is in said second position, and wherein said restraining means normally engages said valve member to maintain said vent outlet within said valve body.

29. A combination according to claim 28 wherein said restraining means further comprises:
   tubular extension means having a first end engaging said valve member and a second end, said fusible link having a first end which engages said tubular member at a location adjacent said second end of said tubular means, said fusible link further having a second end; and
   retaining means engaging said second end of said fusible link.

30. A combination according to claim 29 wherein said second end of said tubular member extends at an oblique angle with respect to said first end.

31. A combination according to claim 30 wherein said retaining means comprises a double ended spring.

32. A combination according to claim 31 wherein said retaining means is inelastically fixed.

33. A combination according to claim 28 wherein said restraining means further comprises mounting bracket means engaging said fusible link at spaced apart locations to position said fusible link in engagement with a portion of said valve member to maintain said valve member in said first position, said portion of said valve member engaging said fusible link at a location between said spaced apart locations.

* * * * *